United States Patent [19]

Ichikawa et al.

[11] Patent Number: 5,051,314

[45] Date of Patent: Sep. 24, 1991

[54] LAMINATE FOR PROTECTING OPTICAL RECORDING LAYER

[75] Inventors: Rinjiro Ichikawa; Kenji Hashimoto, both of Tokyo, Japan

[73] Assignee: Fujimori Kogyo Co., Ltd., Tokyo, Japan

[21] Appl. No.: 400,119

[22] PCT Filed: Dec. 19, 1988

[86] PCT No.: PCT/JP88/01285

§ 371 Date: Aug. 17, 1989

§ 102(e) Date: Aug. 17, 1989

[87] PCT Pub. No.: WO89/06036

PCT Pub. Date: Jun. 29, 1989

[30] Foreign Application Priority Data

Dec. 19, 1987 [JP] Japan .................. 62-321657

[51] Int. Cl.$^5$ .................. B32B 27/30; G11B 7/24; B41M 5/26

[52] U.S. Cl. .................. 428/522; 428/412; 428/416; 428/423.7; 428/424.4; 428/424.6; 428/424.7; 428/425.8; 428/520; 428/463; 428/461; 428/502; 369/272

[58] Field of Search .................. 428/412, 411.1, 419, 428/416, 522, 423.7, 520

[56] References Cited

FOREIGN PATENT DOCUMENTS 59-164942 11/1984 Japan .
62-239441 10/1987 Japan .
62-289938 12/1987 Japan .

*Primary Examiner*—P. C. Sluby
*Attorney, Agent, or Firm*—Armstrong, Nikaido, Marmelstein, Kubovcik & Murray

[57] ABSTRACT

A laminate for protecting an optical recording layer of an information recording member, particularly an information recording layer of an optical card, is disclosed. An organic solvent-resistant synthetic resin layer (12) is provided on the surface of a transparent and optically isotropic synthetic resin sheet (11), said surface being covered with an information recording layer. The synthetic resin layer (12) is composed of a crosslinkable phenoxy ether resin, a polyparabanic acid resin or a polyacrylonitrile resin and is formed by casting. Since the laminate for protecting an optical recording layer has the above-described laminate structure, it has good transparency, good optical isotropy, good mechanical strengths, good hardness, good solvent resistance, low heat conductivity, good heat resistance, good moisture absorption resistance, gas barrier property, etc. and can be put into practice also in respect to production cost.

2 Claims, 2 Drawing Sheets 5,051,314

LAMINATE FOR PROTECTING OPTICAL RECORDING LAYER

FIELD OF TECHNOLOGY

This invention relates to a laminate for protecting the recording layer of an information recording member and more particularly to a laminate which is of use as a protective layer for the information recording layer of an optical card.

BACKGROUND TECHNOLOGY

The optical card, which records information according to the thermal input due to incident light energy, permits a considerably higher recording density than the magnetic card and, as such, is regarded as one of the important information recording media for the future.

The optical card is typically a card measuring about 85.5 mm by 54.0 mm, with a thickness of about 0.8 mm, and is available in several types, such as read-only type and read-and-write type.

Such optical card comprises a protective layer having a thickness of about 0.4 mm and disposed on the reading/writing side thereof, an information recording layer having a thickness of several μm and disposed behind said protective layer, and a substrate or base member disposed behind said information recording layer, all laminated into an integral unit. Since the base member is a mere supporting means, it need not have special optical properties but the protective layer must be transparent and optically isotropic. The material heretofore used for this protective layer is a sheet of polyvinyl chloride, polymethyl methacrylate or polycarbonate. For protection against damage, a hardened surface layer is sometimes disposed on top of the protective layer.

An exemplary laminar construction for the read-only optical card is as follows: from readout side, hardened injury-proof surface layer/protective layer/information recording layer/adhesive layer/base member. The information recording layer may, for example, be a two-layer structure consisting of a non-silver salt pattern layer and an aluminum reflective layer.

An exemplary laminar construction of the read-and-write optical card is as follows: from readout side, hardened injury-proof surface layer/protective layer/information recording layer/base member/protective layer. The information recording layer may, for example, be a two-layer structure consisting of a crust layer (silver salt pattern layer) and a sub-layer.

The protective layer to be used for protecting the recording layer of an optical card must satisfy the following requirements: it should be transparent and optically isotropic (with a small birefringence), of high mechanical strength, hard and non-yielding, low in thermal conductivity, heat-resistant, resistant to the solvent used in the application of a recording medium, and least hygroscopic. Furthermore, it must not be too costly to frustrate the commercial implementation of the product.

However, the optical card comprising a polyvinyl chloride layer as the protective layer and an information recording layer disposed thereon has the disadvantage that even if the retardation value of the polyvinyl chloride layer is set to a predetermined value, this value is frequently altered by exposure to the solvent used in the formation of the information recording layer as well as by thermal history, thus failing to provide an optical card with stable performance.

The optical card carrying an information recording layer on a polymethyl methacrylate sheet has the disadvantage that no means is available for preventing absorption of moisture by the polymethyl methacrylate base and that this material is inadequate in solvent resistance.

The optical card carrying an information recording layer on a polycarbonate sheet also has the disadvantage that this material is liable to be dissolved by the solvent used in the formation of the recording layer.

The object of this invention is to provide a laminate which is suitable for use as a protective layer for the information recording layer.

DISCLOSURE OF THE INVENTION

The laminate for protecting the optical recording layer according to this invention comprises a transparent and optically isotropic synthetic resin sheet (11) and an organic solvent-resistant synthetic resin layer (12) disposed on the side thereof where the information recording layer is formed.

This invention is described in detail hereinafter.

The aforesaid transparent and optically isotropic synthetic resin sheet (11) is preferably a sheet having a glass transition temperature of not lower than 60° C., a retardation value of not more than 100 nm, a visible light transmission of not less than 80 percent, and a water absorption rate of not more than 5 percent, and may for example be a sheet of polyvinyl chloride, polysulfone, polyethersulfone, polycarbonate, polystyrene, polymethyl methacrylate, poly-4-methylpentene-1, ABS resin, phthalic resin, polyarylene resin, amorphous polyolefin, cellulose triacetate or cellulose acetate butyrate. These resins may be copolymers or blends of two or more different resins.

The aforesaid synthetic resin sheet (11) can be formed by the casting technique. In this process, an attempt to obtain a sheet of the desired thickness in one step tends to cause troubles such as surface corrugation, infiltration of air bubbles and loss of clarity. On the other hand, casting the material in more than one stage make it difficult to insure a uniformity of thickness, not to speak of the disadvantage of increased production cost.

Therefore, it is generally economical to produce a sheet of desired thickness by the extrusion technique or the injection molding technique. If the desired retardation value is not obtained in this stage, the product film is heated at a temperature about 10° C. higher than its glass transition temperature to relieve the molecular orientation and thereby reduce the retardation value as necessary.

The thickness of said synthetic resin sheet (11) is preferably at least 0.2 mm and more desirably not less than 0.3 mm. Since this synthetic resin sheet (11) is intended to protect the information recording layer (2), which is described hereinafter, and reflect the incident light in such a manner that the reflected light will be correctly incident on a reader, it must be thick enough to be free of curling and bending and prevent reading errors due to the interception of reflected light by dust particles which might be deposited on the surface. However, from the standpoint of ease of card handling and assurance of optical isotropy, there must be an upper limit to the thickness, which is usually about 1.5 mm. The preferred range of thickness is 0.3 to 0.7 mm.

The above synthetic resin sheet (11) is provided with an organic solvent-resistant synthetic resin layer (12) on the side where the information recording layer is disposed. The provision of this layer (12) makes it possible to avoid alterations in the retardation value of the synthetic resin sheet (11) in the course of formation of the information recording layer (2) as will be described hereinafter.

The organic solvent-resistant synthetic resin layer (12) must be resistant to the organic solvent to be used in the formation of the information recording layer (2) and may appropriately be formed from a partial hydrolysate of ethylene-vinyl acetate copolymer, polyvinyl alcohol, polyamide resin, polyacrylonitrile resin, polyparabanic acid resin, polyamino resin, phenoxy ether crosslinking resin, epoxy resin, acrylic resin, acryl-epoxy resin, melamine resin, phenolic resin, urethane resin or the like. Preferred are layers of phenoxy ether crosslinkable resin, polyparabanic acid resin and polyacrylonitrile resin.

The organic solvent-resistant synthetic resin layer (12) may be formed by direct casting on said synthetic resin sheet (11). Alternatively, an organic solvent-resistant synthetic film (12) may be prepared by casting and be then laminated onto the synthetic resin sheet (11) with the aid of an adhesive. Usually, the latter laminating process using an adhesive is employed. If necessary, an intermediate layer (13) may be interposed between said synthetic resin sheet (11) and organic solvent-resistant synthetic resin layer (12). It should be understood that this intermediate layer (13) must also be optically isotropic.

The thickness of said organic solvent-resistant layer is set somewhere between 1 and 500 μm and preferably in the range of 2 to 300 μm.

The above procedure gives an optically isotropic protective layer (1) having a laminar structure comprising a synthetic resin sheet (11) and an organic solvent-resistant synthetic resin layer (12). Because this protective layer (1) serves as a pathway through which both incident light and reflected light travel, its overall retardation value should be not more than 100 nm, preferably not more than 80 nm and most desirably not more than 50 nm.

The retardation value R is the product of the thickness d of a film multiplied by the absolute value of the difference between two refractive indices in directions perpendicular to said film or sheet and as such can be expressed by the following equation.

$$R = d \cdot |n1 - n2|$$

where n1 represents the refractive index in an optional direction and n2 is the refractive index in a direction normal to n1.

The information recording layer (2) is disposed on the organic solvent-resistant synthetic resin layer (12) of the optically isotropic protective layer (1) which is a laminar structure comprising said synthetic resin sheet (11) and organic solvent-resistant synthetic resin layer.

The information recording layer is usually a two-layer structure comprising
(1) a recording layer (21) and a reflective layer (22) or
(2) a recording layer (21) and a non-reflective layer (23).

In either case, the recording layer (21) is disposed closer to said organic solvent-resistant synthetic resin layer (12).

In the first-mentioned structure (1), information bits are written into the recording layer (21) and the reading light is not reflected as it hits the bit but is reflected by the reflected layer (22) when it does not.

In the second-mentioned case (2), the recording layer (21) is a reflective layer such as a silver salt pattern layer and the recording layer (21) is destroyed in writing and the reading light is not reflected when it hits the destroyed area but is reflected when it hits other areas.

The recording layer (21) of the structure (2) may for example be made of an inorganic system such as Te, Te-C (Te-alkyl), $CS_2$-Te, Te-Se, Pb-Te-Se, TeOx, TeOx-Pd, Bi-Te, Te-Ti-Ag-Se, $Bi_2Te_3$-$Sb_2Se_3$, Sn, In, In-$In_2O_3$, In-$CH_4$-$O_2$, Se, Sb-Se, Ge, $SiO_2$, Tb-Gd, Gd-Co, Gd-Tb-Fe, Gd-Tb-Fe-Ge, Gd-Tb-Co, Tb-Fe, Tb-Fe-Co, Ag-Zn-Al, Cu-Al-In-Sn, Au-Al, Mn-Cu-Bi, Mn-Pt-Sb, etc., an organic dye system such as cyanine, leuco, quinone and other dye systems, an organic photochromic system such as spiropyran, furgides, etc., or an organometal complex system.

As an example of the recording layer (21) of the structure (2), there may be mentioned a silver salt pattern layer.

As an example of the reflective layer (22) of the structure (2), there may be mentioned a metal deposition layer of, say, aluminum.

As the non-reflective layer (23) of the structure (2), there may be mentioned an adhesive, light-absorbing resin layer such as an acrylic resin, urethane resin or epoxy resin layer.

On the surface of the synthetic resin sheet (11) which is opposite to the organic solvent-resistant synthetic resin layer (12), there may be disposed an injury-proof crust layer as necessary.

Disposed behind the information recording layer (2) is a base member (3) such as a member of polyvinyl chloride, polyester, polycarbonate or the like. Since the base member (3) is a mere support, it need not have any special optical properties. The above-mentioned protective layer (1) may further be laminated from behind the base member (3).

The thickness of the base member (3) (or the base member (3) plus the protective layer (1)) which is disposed behind the information recording layer (2) is preferably in the range of 0.2 to 0.6 mm.

The overall thickness of the optical card thus constructed is usually about 0.8 mm in many instances. Though there is no particular limitation on the size of the optical card, it is generally about 85.5 mm by about 54.0 mm in many instances.

The operation of this invention is described below.

As described in detail, the optical card is manufactured by disposing an organic solvent-resistant synthetic layer (12) on the surface of a transparent and optically isotropic synthetic resin sheet (11), then an information recording layer (2) on top of said organic solvent-resistant synthetic resin layer (12), and further a base member (3) (or a base member (3) and a protective layer (1)) behind said information recording layer (2).

By selecting a suitable information recording layer, the card can be made available as a read-only, read-and-write or other type card. It can also be made available as an erasable or rewrite type card. Recording, reading or erasing is carried out generally using a laser beam.

While the laminate of synthetic resin sheet (11) and organic solvent-resistant synthetic resin layer (12) functions as a protective layer (1) to physically protect the information recording layer (2), the organic solvent-resistant synthetic resin layer (12) not only prevents alteration of the retardation value of the synthetic resin sheet (11) at formation of the information recording layer (2) but is effective in preventing oxidation of the information recording layer (2) and penetration of moisture into the same layer (2) to thereby inhibit its degradation.

EFFECTS OF THE INVENTION

The optical recording layer-protective laminate according to this invention, because of its specific laminar construction, is possessed of all the necessary properties, namely transparency, optical isotropy, sufficient mechanical strength, hardness, solvent resistance, low thermal conductivity, heat resistance, freedom from moisture absorption, gas barrier property and so on and is practically advantageous in cost terms, too.

Therefore, the optical recording layer-protective laminate of this invention satisfies the requirements which could not be met by the conventional single-component sheet of polyvinyl chloride, polymethyl methacrylate, polycarbonate or the like.

In these views, various symbols have the following meanings.

(1) ... Protective layer
  (11) ... Synthetic resin sheet
  (12) ... Organic solvent-resistant synthetic resin layer
  (13) ... Intermediate layer
(2) ... Information recording layer
  (21) ... Recording layer
  (22) ... Reflective layer
  (23) ... Non-reflective layer
  (b) ... Bit
(3) ... Base member
(ad) ... Adhesive

BEST MODE OF WORKING THE INVENTION

The following examples are further illustrative of this invention. All parts are by weight.

EXAMPLE 1

Figure 1:
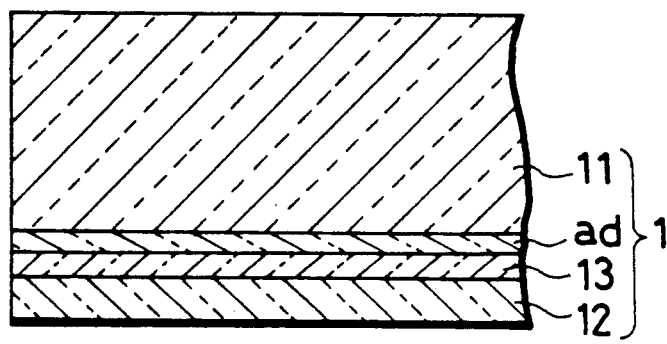
FIG. 1 is a cross-sectional view showing an example of the optical recording layer-protective laminate according to this invention.
Figure 2:
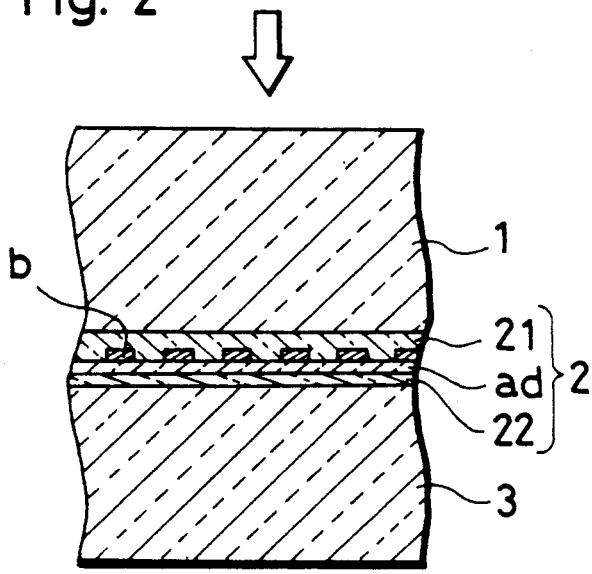
FIG. 2 is a cross-sectional view showing an example of the optical card fabricated using the same laminate as a protective layer (1).

FIG. 1 is a cross-sectional view showing an example of the optical recording layer-protective laminate according to this invention. FIG. 2 is a cross-sectional view showing an example of the optical card fabricated using the same laminate as a protective layer (1).

A 15% solution of an ethylene-vinyl alcohol copolymer with an ethylene content of 32 mole % in a solvent mixture (50:50) of water and isopropyl alcohol was cast on a polyester film and dried at 80°–120° C. to give an intermediate layer (13) with a thickness of 15 μm.

Then, a phenoxy ether crosslinkable resin dope of the following composition was cast on the above-mentioned intermediate layer (13) and dried to provide an organic solvent-resistant synthetic resin layer (12) with a thickness of 38 μm.

| | |
|---|---|
| Phenoxy ether resin (manufactured by Union Carbide Corporation) | 40 Parts |
| Methyl ethyl ketone | 40 Parts |
| Cellosolve acetate | 20 Parts |
| Tolylene diisocyanate-trimethylolpropane adduct, 75% solution (Coronate L manufactured by Nippon Polyurethane Co., Ltd.) | 40 Parts |

Then, from the polyester film, the laminate of (13)/(12) having a thickness of 53 μm was peeled off.

The reason why the intermediate layer (13) of ethylene-vinyl alcohol copolymer was first formed on the polyester film was that if the phenoxy ether crosslinkable resin dope were cast directly on the polyester film and dried to form an organic solvent-resistant synthetic resin layer (12), the layer (12) could not be peeled off smoothly from the polyester film.

On the side of the intermediate layer (13) of the above laminate, an ester-urethane adhesive (ad) was applied and a synthetic resin sheet (11) made of polycarbonate resin with a thickness of 0.35 mm and a retardation value of 30 nm was bonded to provide a protective layer (1) comprising a 0.4 mm-thick laminate of (11)/(ad)/(13)/(12).

The organic solvent-resistant synthetic resin layer (12) side of the above protective layer (1) was coated with a recording layer-forming dope of the following composition, followed by drying to provide a recording layer (21) with a thickness of 10 μm.

| | |
|---|---|
| p-Azoxyanisole | 3 Parts |
| Polyvinyl chloride | 7 Parts |
| Dimethylformamide | 80 Parts |

On a 350 μm-thick matted polyester sheet, as an example of the base sheet (3), aluminum was deposited to provide a reflective layer (22). Then, the aluminum-deposited surface was coated with a urethane adhesive (ad) and laminated onto the recording layer (21) side of said protective layer (1).

By the above procedure was obtained a 0.78 mm-thick optical card consisting of protective layer (1)/information recording layer (2)/base member (3) or, more particularly, (11)/(ad)/(13)/(12)/(21)/(ad)/(22)/(3).

Referring to FIG. 2, (b) in the recording layer (21) represents a record bit. When illuminated from the direction of the open arrowmark, the rate of reflection from the bit (b) is about 5%, while the rate of reflection from the area other than the bit (aluminum reflective layer) is about 80%, thus allowing to read the information written into the information recording layer (2).

COMPARATIVE EXAMPLE 1

The procedure of Example 1 was repeated except that a polycarbonate sheet (11) molded by the injection method and having a thickness of 0.40 mm and a retardation value of 30 nm was used as the protective layer (1) to construct an optical card comprising a laminar structure of protective layer (1)/information recording layer (2)/base member (3).

However, when the recording layer-forming dope was applied to the polycarbonate sheet (11), surface dissolution to cracking occurred to reduce optical transparency and, hence, scattered reflection, with the result that writing and reading errors took place.

EXAMPLE 2

Figure 3:
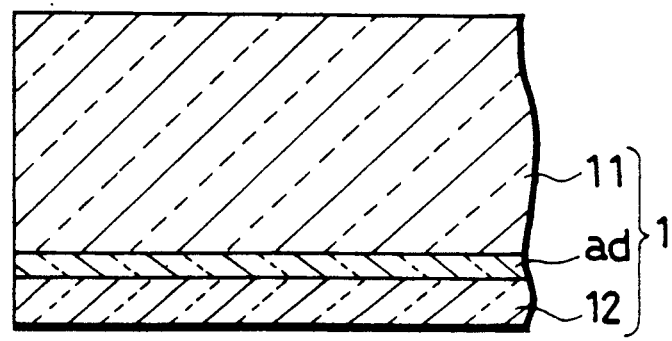
FIG. 3 is a cross-sectional view showing another example of the optical recording layer-protective laminate according to this invention.

FIG. 3 is a cross-sectional view showing another example of the optical recording layer-protective laminate according to this invention.

Polyparabanic acid resin was dissolved in a solvent mixture (50:50) of dimethylformamide and N-methylpyrrolidone at a final concentration of 20% and the solution was cast into a 20 μm thick film (an organic solvent-resistant synthetic resin layer (12)).

To one side of this organic solvent-resistant synthetic resin layer (12) was applied an acrylic adhesive (ad) and a synthetic resin sheet (11) comprising an ABS resin sheet molded by the injection method and having a thickness of 0.35 mm and a retardation value of 15 nm was bonded to that side to give a protective layer (1) comprising a 0.4 mm-thick laminate having a laminar structure of (11)/(ad)/(12).

Using this protective layer (1), an optical card having a thickness of 0.79 mm was fabricated in the same manner as in Example 1, except that a polyvinyl chloride sheet with a thickness of 0.36 mm was used as the base member (3).

EXAMPLE 3

An optical card having a thickness of 0.78 mm was fabricated in the same manner as in Example 2 except that a polystyrene sheet molded by the injection molding method and having a thickness of 0.35 mm and a retardation value of 30 nm was used as the synthetic resin sheet (11).

EXAMPLE 4

Figure 4:
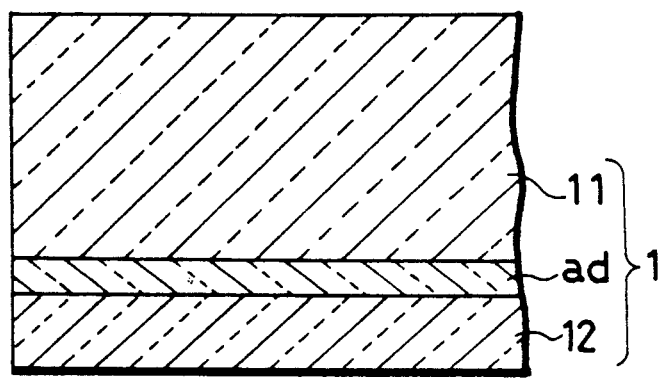
FIG. 4 is a cross-sectional view showing still another example of the optical recording layer-protective laminate according to this invention.
Figure 5:
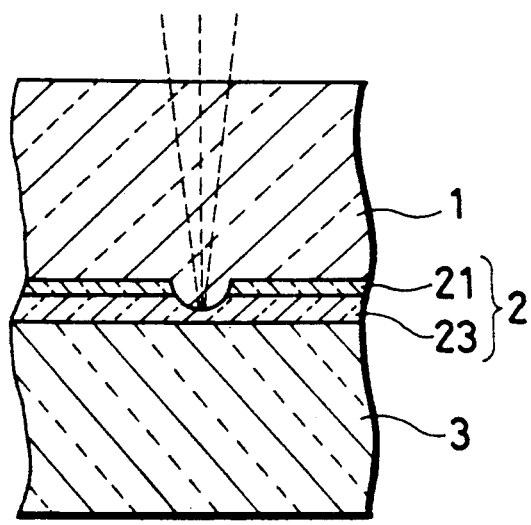
FIG. 5 is a cross-sectional view showing an example of the optical card constructed using the above laminate as a protective layer (1).

FIG. 4 is a cross-sectional view showing still another example of the optical recording layer-protective laminate according to this invention. FIG. 5 is a cross-sectional view showing an example of the optical card fabricated using the above laminate as a protective layer (1).

In 90 parts of dimethylformamide was dissolved 10 parts of an acrylonitrile-methyl acrylate copolymer obtainable from 95 parts of acrylonitrile and 5 parts of methyl acrylate and the solution was cast on a biaxially oriented polyester film to give a 35 μm-thick layer (an organic solvent-resistant layer (12)).

To one side of this organic solvent-resistant synthetic resin layer (12) was applied an esterurethane adhesive (ad), and a synthetic resin sheet (11) comprising a polycarbonate sheet molded by the injection molding method and having a thickness of 0.35 mm and a retardation value of 30 nm was bonded to that side to give a protective layer comprising a 0.4 mm-thick laminate having a laminar structure of (11)/(ad)/(12).

On the organic solvent-resistant synthetic resin layer (12) side of this protective layer (1) was formed a 0.1 μm-thick recording layer (21) comprising a silver salt pattern layer. Then, a non-reflective layer (23) of urethane resin having a thickness of 4–5 μm was superimposed thereon and, furthermore, a 0.34 mm-thick polyvinyl chloride sheet as an example of base member (3) was disposed on top of said non-reflective layer (23).

The above procedure provided the desired optical card of read-and-write type having a thickness of 0.78 mm.

INDUSTRIAL UTILITY

The laminate according to this invention is of use as a laminate for protecting the optical recording layer of an information recording medium and particularly as a protective layer for protecting the information recording layer of an optical card.

We claim:

1. A laminate for protecting an optical recording layer, comprising:

an organic solvent-resistant synthetic resin layer comprising a resin selected from the group consisting of phenoxy ether crosslinking resin, polyparabanic acid resin and polyacrylonitrile resin, said layer being formed by casting and disposed on the optical recording layer; and a transparent and optically isotropic synthetic resin sheet disposed on said organic solvent-resistant synthetic resin layer, wherein said laminate has a retardation value of not more than 100 nm.

2. An optical card, comprising:

a substrate;

an optical recording layer;

an organic solvent-resistant synthetic resin layer comprising a resin selected from the group consisting of phenoxy ether crosslinking resin, polyparabanic acid resin and polyacrylonitrile resin, said layer being formed by casting and disposed on the optical recording layer; and a transparent and optically isotropic synthetic resin sheet disposed on said organic solvent-resistant synthetic resin layer, wherein said laminate has a retardation value of not more than 100 nm.

* * * * *